US012279553B2

(12) United States Patent
Southwell

(10) Patent No.: US 12,279,553 B2
(45) Date of Patent: Apr. 22, 2025

(54) HIGH EFFICIENCY LAWN MOWER BLADE

(71) Applicant: Husqvarna AB, Huskvarna (SE)

(72) Inventor: John Southwell, Huntersville, NC (US)

(73) Assignee: HUSQVARNA AB, Huskvarna (SE)

(*) Notice: Subject to any disclaimer, the term of this patent is extended or adjusted under 35 U.S.C. 154(b) by 739 days.

(21) Appl. No.: 17/613,895

(22) PCT Filed: Oct. 20, 2020

(86) PCT No.: PCT/US2020/056499
§ 371 (c)(1),
(2) Date: Nov. 23, 2021

(87) PCT Pub. No.: WO2021/194554
PCT Pub. Date: Sep. 30, 2021

(65) Prior Publication Data
US 2022/0346311 A1    Nov. 3, 2022

Related U.S. Application Data

(60) Provisional application No. 62/994,978, filed on Mar. 26, 2020.

(51) Int. Cl.
*A01D 34/73* (2006.01)
*A01D 69/02* (2006.01)
(52) U.S. Cl.
CPC ........... *A01D 34/736* (2013.01); *A01D 69/02* (2013.01)
(58) Field of Classification Search
CPC ....... A01D 34/736; A01D 69/02; A01D 34/73
See application file for complete search history.

(56) References Cited

U.S. PATENT DOCUMENTS 3,485,022 A * 12/1969 Freedlander ........... A01D 34/73
56/295
3,636,685 A * 1/1972 Speckman ............. A01D 34/73
56/295

(Continued)

FOREIGN PATENT DOCUMENTS

CN      106664945 A    5/2017
DE      4127581 C2     6/1993

(Continued)

OTHER PUBLICATIONS

Lawn Boy, "New Lawn Boy Original Equipment Mulching Fan Blade-Part# 99-6351", Retrieved From https://www.ebay.com/c/1917171516, Aug. 12, 2021, 29 Pages.

(Continued)

*Primary Examiner* — Arpad Fabian-Kovacs
(74) *Attorney, Agent, or Firm* — Burr & Forman LLP

(57) ABSTRACT

A cutting blade (100) for a lawn mower may include a mounting portion (130) and a plurality of cutting elements (102,104,106,108). The mounting portion (130) may include a plurality of mounting arms (136) and a mounting orifice (132) formed at an axis of the cutting blade. The mounting orifice (132) may be configured to interface with a shaft of the lawn mower. Each of the cutting elements (102,104,106, 108) may be operably coupled to a corresponding one of the mounting arms (136). Each of the cutting elements may include a wing portion (110) at a distal end thereof, and a transition region (120) configured to operably couple the wing portion (110) to a respective one of the mounting arms (136). The cutting elements may further include a first cutting edge (140) disposed at the wing portion (110), and a second cutting edge (142) disposed at the transition region (120).

18 Claims, 7 Drawing Sheets

(56) References Cited

U.S. PATENT DOCUMENTS

| | | | |
|---|---|---|---|
| 4,250,621 A | 2/1981 | Houle | |
| D289,524 S * | 4/1987 | Andersson | D15/17 |
| 4,706,446 A | 11/1987 | Doi et al. | |
| 4,995,228 A * | 2/1991 | Hladik, Jr. | A01D 34/73 56/DIG. 17 |
| 5,033,259 A * | 7/1991 | Adcock | A01D 34/73 56/DIG. 17 |
| 5,327,710 A * | 7/1994 | Plamper | A01D 34/73 56/DIG. 17 |
| 5,501,068 A | 3/1996 | Martz | |
| 5,561,972 A | 10/1996 | Rolfe | |
| 5,642,609 A | 7/1997 | Morrison | |
| 5,711,141 A * | 1/1998 | Pitman | A01D 34/73 56/DIG. 17 |
| 6,052,979 A * | 4/2000 | Tutschka | A01D 34/73 56/DIG. 20 |
| 6,301,868 B1 * | 10/2001 | Siplinger | A01D 34/73 56/255 |
| 6,470,662 B1 | 10/2002 | Burke et al. | |
| 6,655,119 B2 * | 12/2003 | Hasei | A01D 34/826 56/DIG. 17 |
| 6,679,039 B2 * | 1/2004 | Deschamps | A01D 34/826 56/295 |
| D487,098 S * | 2/2004 | Arfstrom | D15/17 |
| D574,860 S * | 8/2008 | Potts | D15/17 |
| 7,448,194 B2 * | 11/2008 | Koike | A01D 34/71 56/320.1 |
| D598,475 S * | 8/2009 | Roth | D15/17 |
| 7,617,664 B1 | 11/2009 | Fitzpatrick | |
| D649,981 S * | 12/2011 | Roth | D15/17 |
| D723,589 S * | 3/2015 | Nishihara | D15/17 |
| 9,003,963 B2 | 4/2015 | Knecht et al. | |
| D766,332 S * | 9/2016 | Poole | D15/17 |
| 9,468,144 B2 | 10/2016 | Kurioka et al. | |
| D801,394 S * | 10/2017 | Southwell | D15/17 |
| D812,443 S * | 3/2018 | Gonzalez | D8/20 |
| D837,266 S * | 1/2019 | Wong | D15/17 |
| D837,267 S * | 1/2019 | Wong | D15/17 |
| 10,188,031 B2 * | 1/2019 | Carlson | A01D 34/76 |
| D854,052 S * | 7/2019 | Jensen | D15/17 |
| D873,302 S * | 1/2020 | Southwell | D15/17 |
| D873,866 S * | 1/2020 | Jensen | D15/17 |
| 10,806,076 B2 * | 10/2020 | Schaedler | A01D 34/78 |
| D902,262 S * | 11/2020 | Hoover | D15/17 |
| 2002/0152736 A1 * | 10/2002 | Hasei | A01D 34/73 56/255 |
| 2005/0172601 A1 * | 8/2005 | Besogne | A01D 34/826 56/295 |
| 2005/0229573 A1 * | 10/2005 | Curran | A01D 34/73 56/255 |
| 2010/0000193 A1 * | 1/2010 | De Benedetto | A01D 34/005 56/295 |
| 2013/0239538 A1 | 9/2013 | Gohsman | |
| 2014/0196428 A1 * | 7/2014 | Shiotsuki | A01D 34/73 56/289 |
| 2015/0052868 A1 | 2/2015 | Schreiner | |
| 2015/0082763 A1 * | 3/2015 | Nishihara | A01D 34/63 56/289 |
| 2018/0064027 A1 * | 3/2018 | Gonzalez | A01D 34/73 |
| 2019/0000018 A1 | 1/2019 | Klein et al. | |
| 2019/0104678 A1 | 4/2019 | Schaedler et al. | |
| 2022/0369548 A1 * | 11/2022 | Cheetham | A01D 34/736 |

FOREIGN PATENT DOCUMENTS

| | | | |
|---|---|---|---|
| EP | 1459616 A2 | 9/2004 | |
| EP | 2923554 A1 * | 9/2015 | A01D 34/68 |
| EP | 3420804 A1 | 1/2019 | |
| GB | 2411567 A | 9/2005 | |
| JP | 2002320872 A | 11/2002 | |
| KR | 101734411 B1 | 5/2017 | |

OTHER PUBLICATIONS

International Search Report and Written Opinion for International Application No. PCT/US2020/056499 mailed Jan. 26, 2021.

* cited by examiner

HIGH EFFICIENCY LAWN MOWER BLADE

TECHNICAL FIELD

Example embodiments generally relate to lawn mower blades and, more particularly, relate to a lawn mower blade that is designed to provide good performance while reducing power consumption.

BACKGROUND

Lawn care tasks are commonly performed using various tools and/or machines that are configured for the performance of corresponding specific tasks. Certain tasks, like grass cutting, are typically performed by lawn mowers. Lawn mowers may come in many different sizes and may have wide variances in their design and capabilities. However, beyond mere changes in design, size and function, lawn mowers have more recently also provided users with increased options in terms of powering the lawn mowers. While petrol or gasoline engines were dominant for decades, a market is quickly developing for battery powered lawn mowers.

Unlike petrol or gasoline engines that can be refueled very quickly at just about any location on a job site, battery powered devices need to be taken out of operation for a while in order to be recharged (unless a new and previously charged battery can be interchanged with the depleted battery). However, for large jobs, even battery replacement may not be fully enabling for completing the job if there is not sufficient time to charge depleted batteries while the substitute battery or batteries are themselves being depleted during operation. In other words, if the speed at which depleted batteries recharge is not as fast as the speed at which batteries in use are depleted, then even battery replacement may not enable a job to be completed without waiting at least some time for battery charging. The potential limitations of battery charging can make it even more important that the battery powered devices have sufficient capacity to complete a job at a job site on a single charge (or at least without having to wait for any charge time before completing the job) in order to secure the viability and growth of this emerging market.

In order to deliver on these expectations, improving the efficiency of the lawn mower may be helpful. Moreover, since turning the mower blade can be one of the main sources of power consumption in a battery powered lawn mower, improving the efficiency of the lawn mower blade itself may contribute significantly to achieving the usage time that is achievable for a given battery powered lawn mower.

BRIEF SUMMARY OF SOME EXAMPLES

Some example embodiments may provide a cutting blade for a lawn mower. The cutting blade may include a mounting portion and a plurality of cutting elements. The mounting portion may include a plurality of mounting arms and a mounting orifice formed at an axis of the cutting blade. The mounting orifice may be configured to interface with a shaft of the lawn mower. Each of the cutting elements may be operably coupled to a corresponding one of the mounting arms. Each of the cutting elements may include a wing portion at a distal end thereof, and a transition region configured to operably couple the wing portion to a respective one of the mounting arms. The cutting elements may further include a first cutting edge disposed at the wing portion, and a second cutting edge disposed at the transition region.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
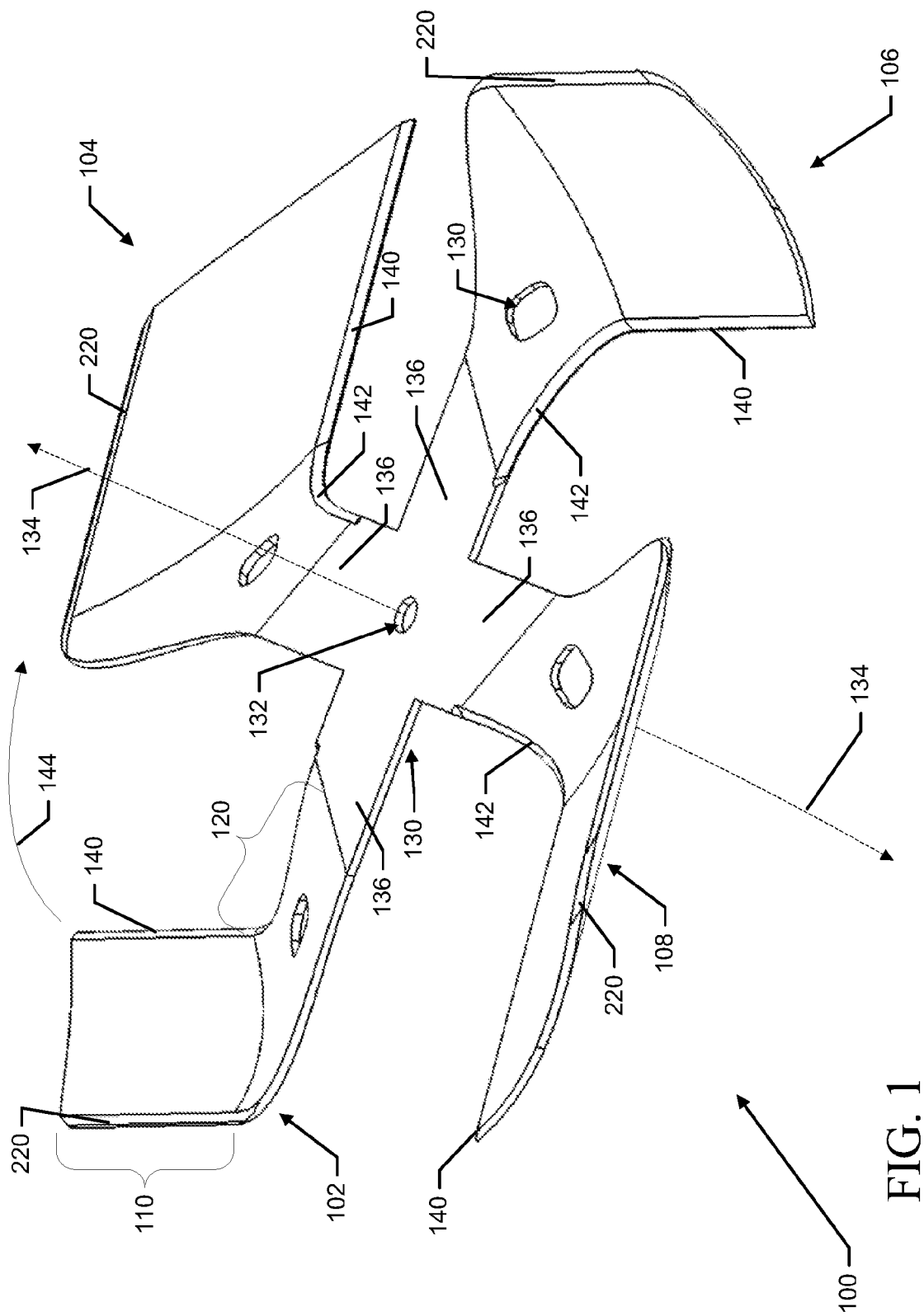
FIG. 1 illustrates a top perspective view of a high efficiency blade according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Some example embodiments may provide a lawn mower blade with design features and geometries that define a structure capable of delivering high performance with less power consumption. In this regard, for example, the high efficiency blade described herein includes multiple (e.g., four) blade elements that each include two cutting edges. The cutting edges are provided in a swept configuration with a lift geometry that produces more than a 50% (in some cases as much as 63% or more) lift than conventional blade designs with at least 40% less drag. As a result, the structures provided herein deliver a highly efficient, yet quality cutting experience.

Figure 2:
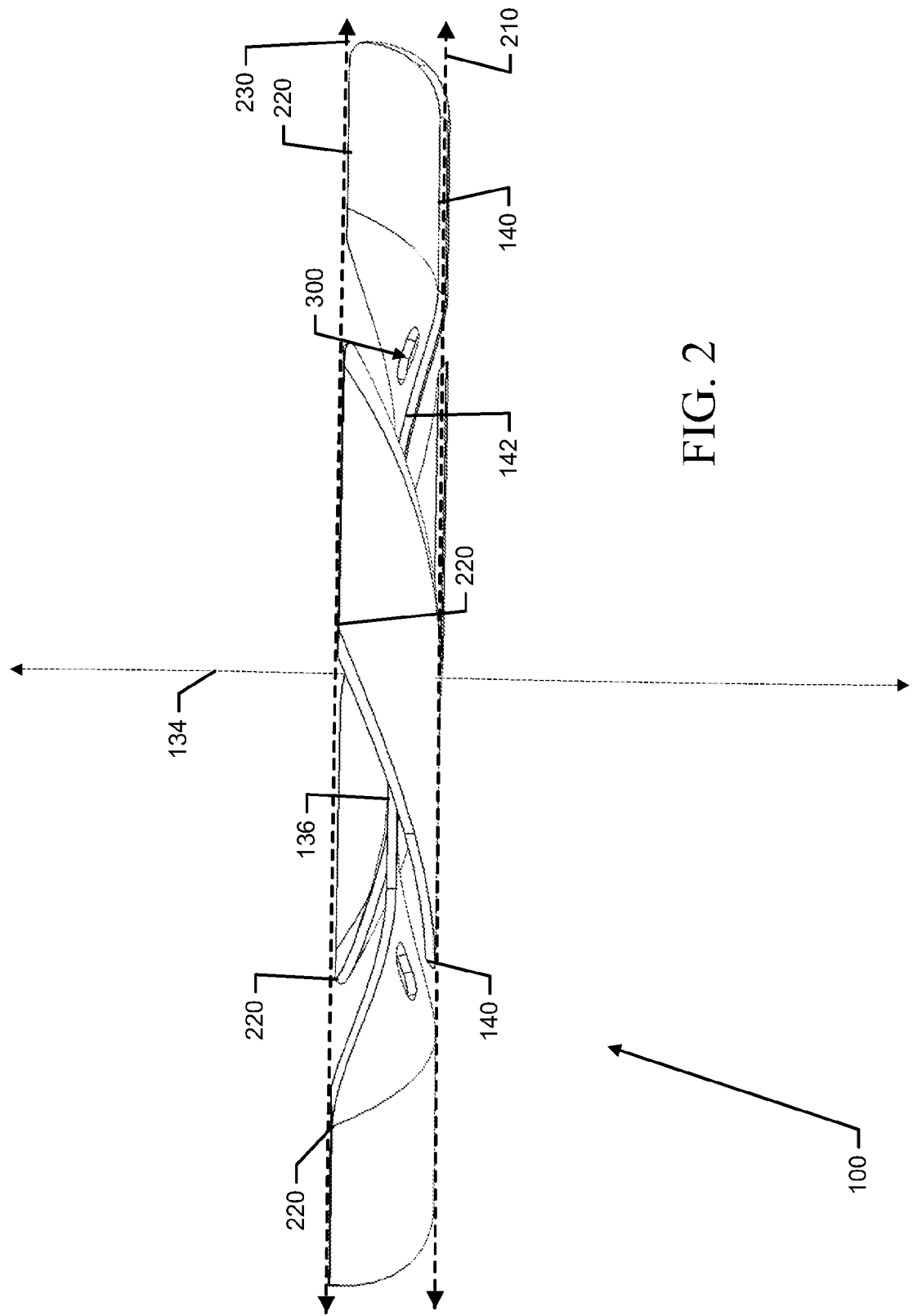
FIG. 2 illustrates a side view of the high efficiency blade of FIG. 1 according to an example embodiment.
Figure 3:
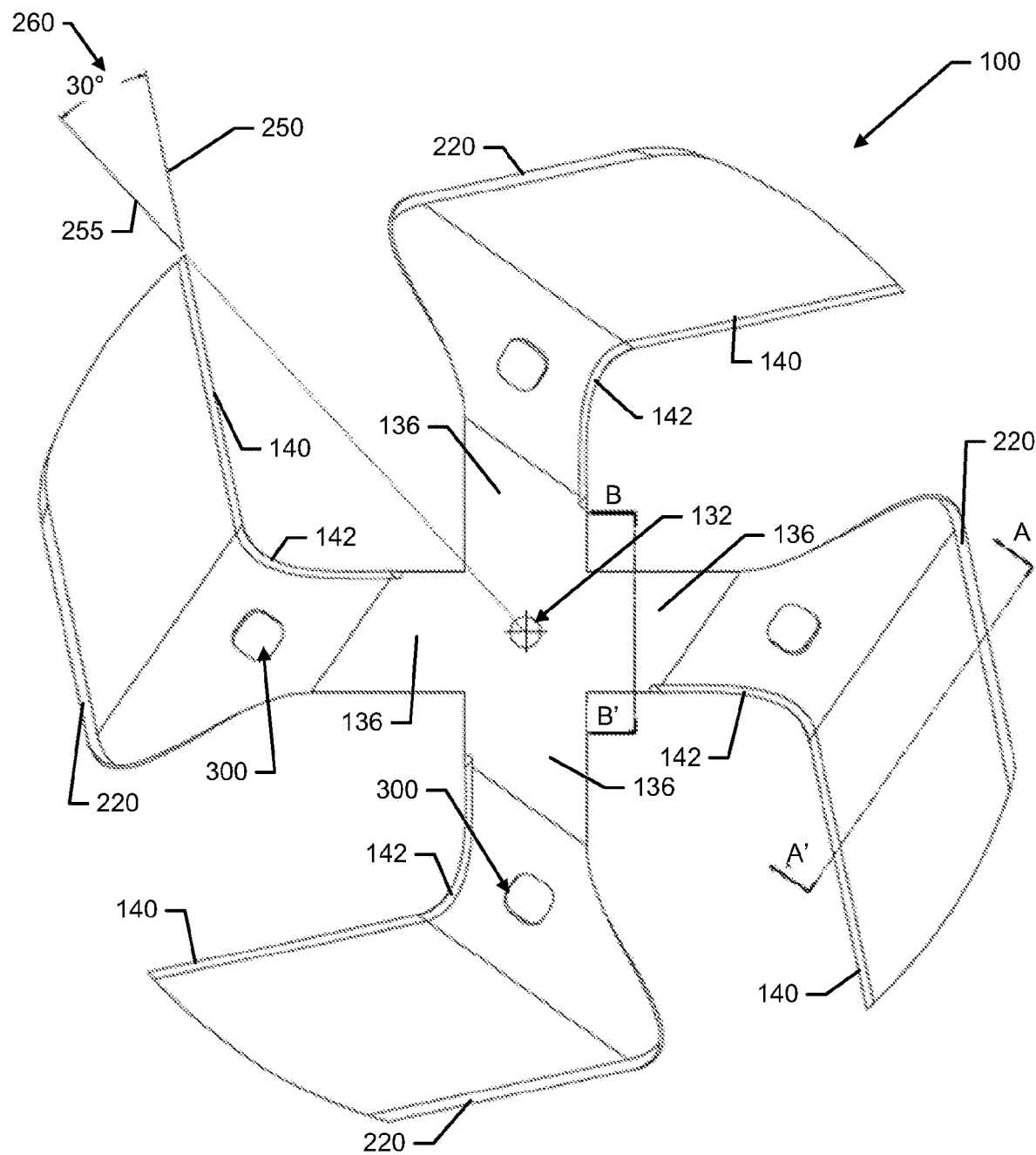
FIG. 3 illustrates a top view of the high efficiency blade according to an example embodiment.
Figure 4:
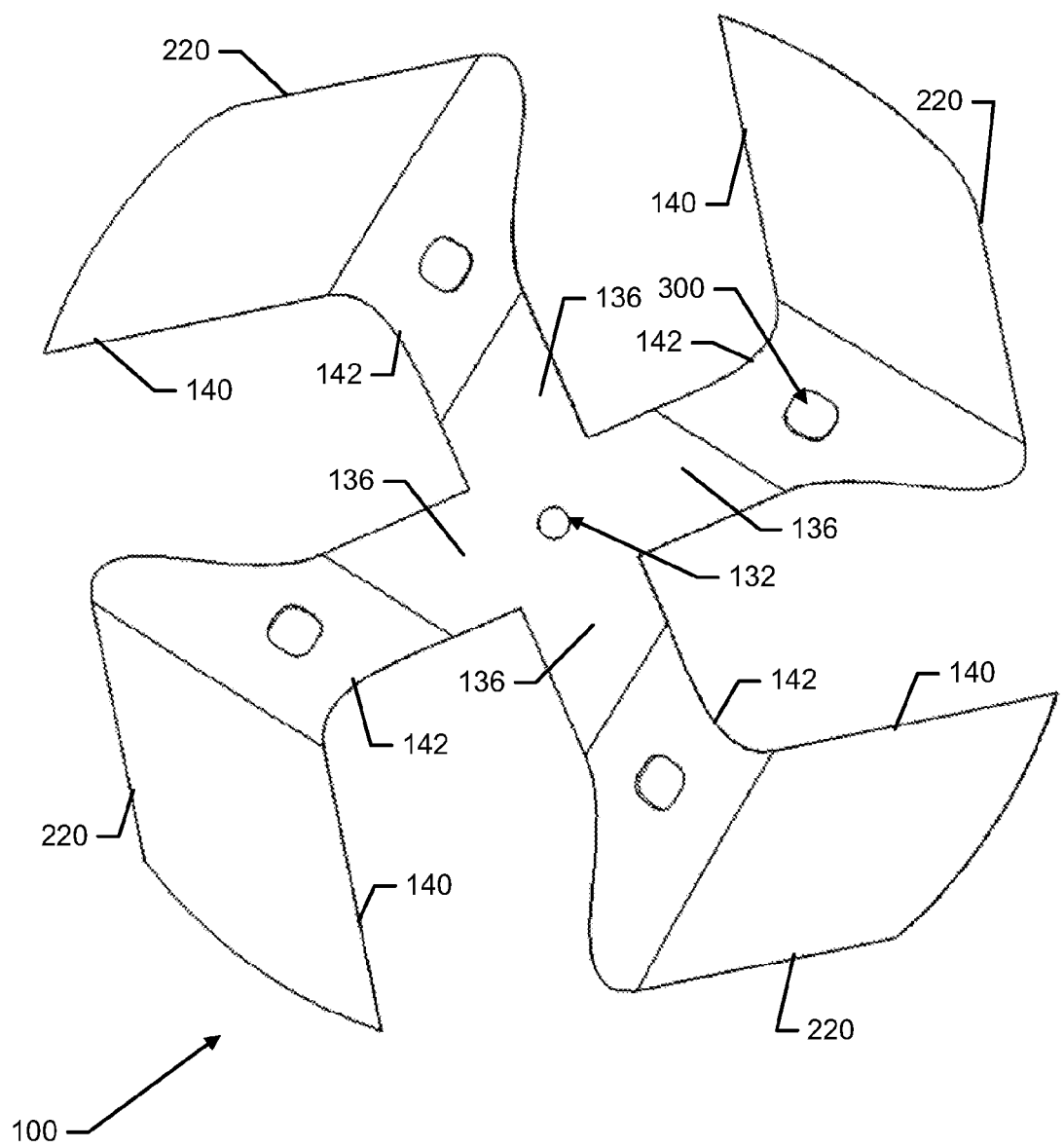
FIG. 4 illustrates a bottom view of the high efficiency blade according to an example embodiment.
Figure 5:
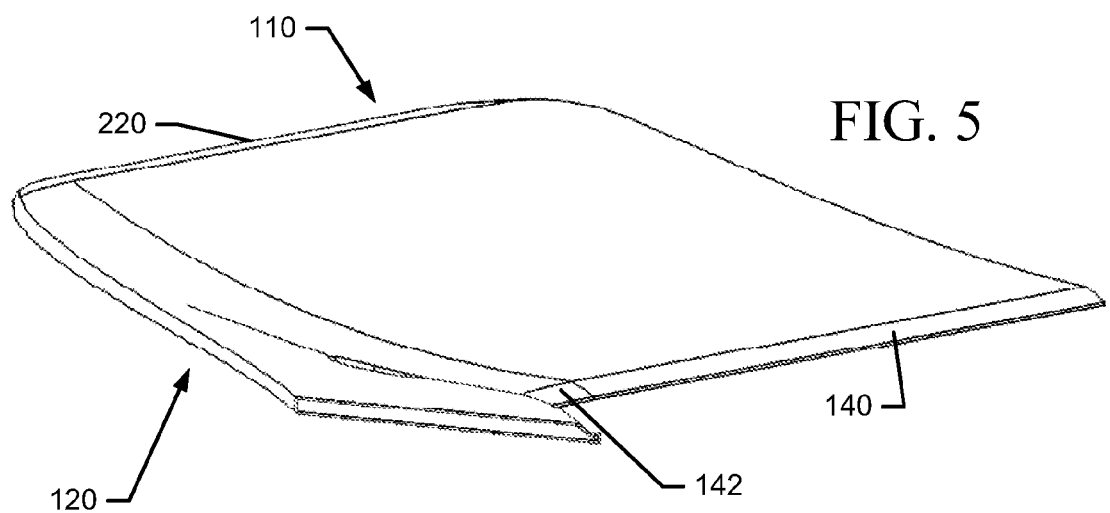
FIG. 5 illustrates a perspective view of a wing portion and a transition region of a single cutting element of the high efficiency blade in isolation according to an example embodiment.
Figure 6:
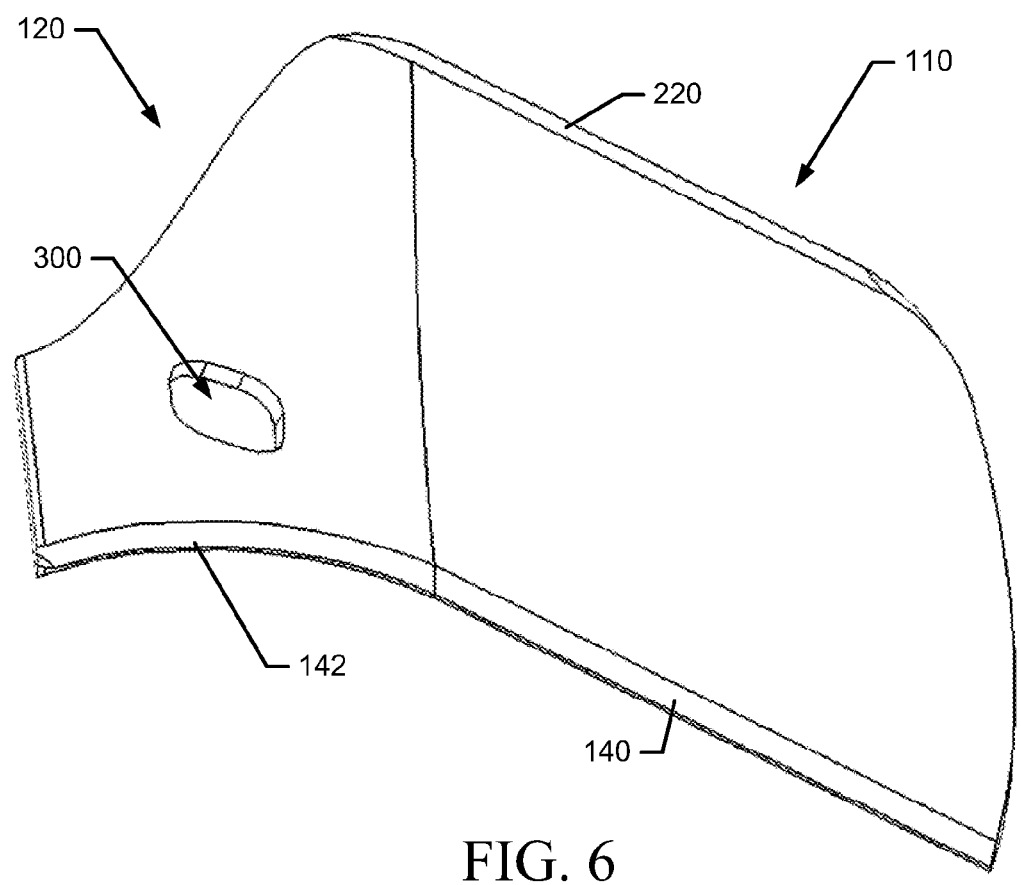
FIG. 6 is a top, perspective view of the wing portion and the transition region 120 of the single cutting element of FIG. 5 according to an example embodiment.
Figure 8:
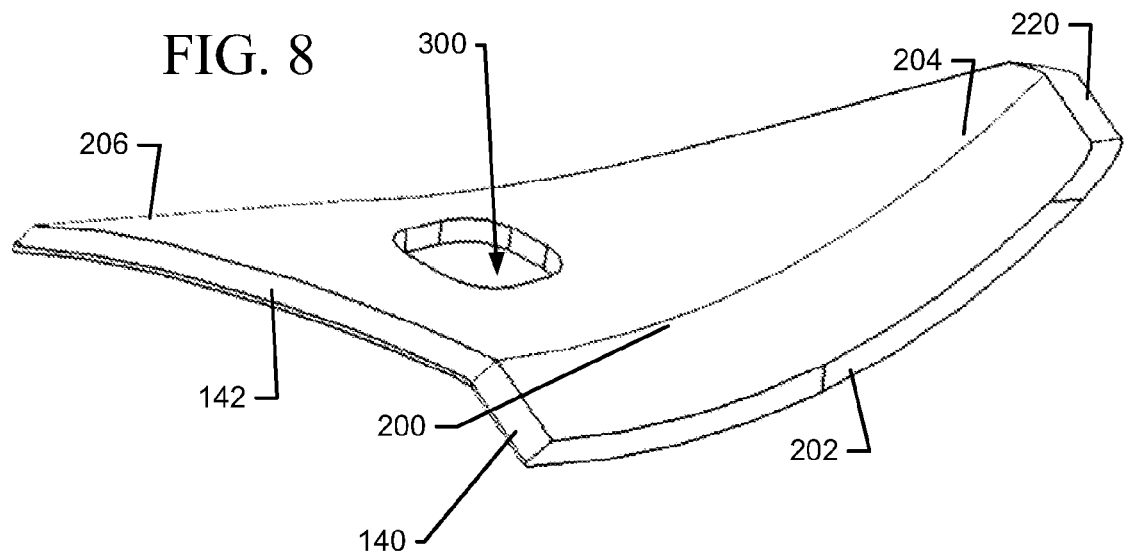
FIG. 8 is a perspective view of the wing portion and transition region from a point displaced from a distal end of the wing portion according to an example embodiment.
Figure 7:
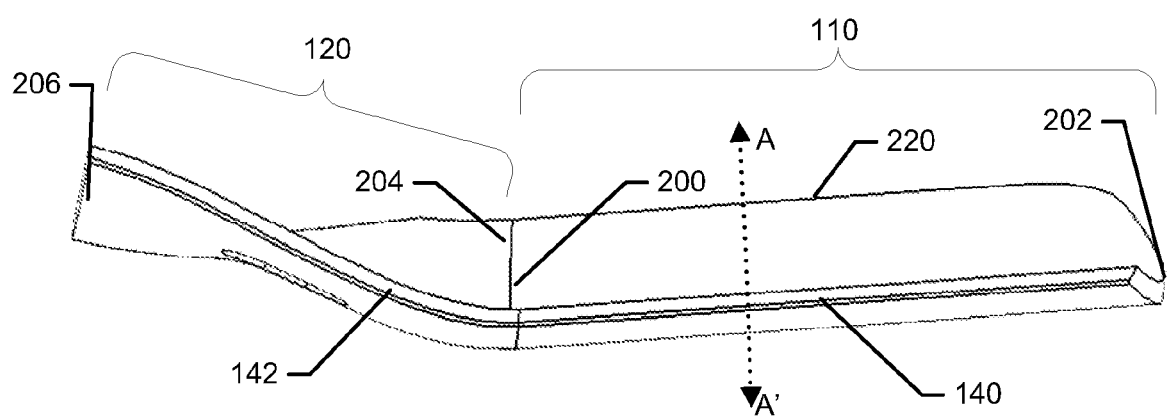
FIG. 7 is a perspective view of the single cutting element from a point situated in front of the wing portion according to an example embodiment.
Figure 9:
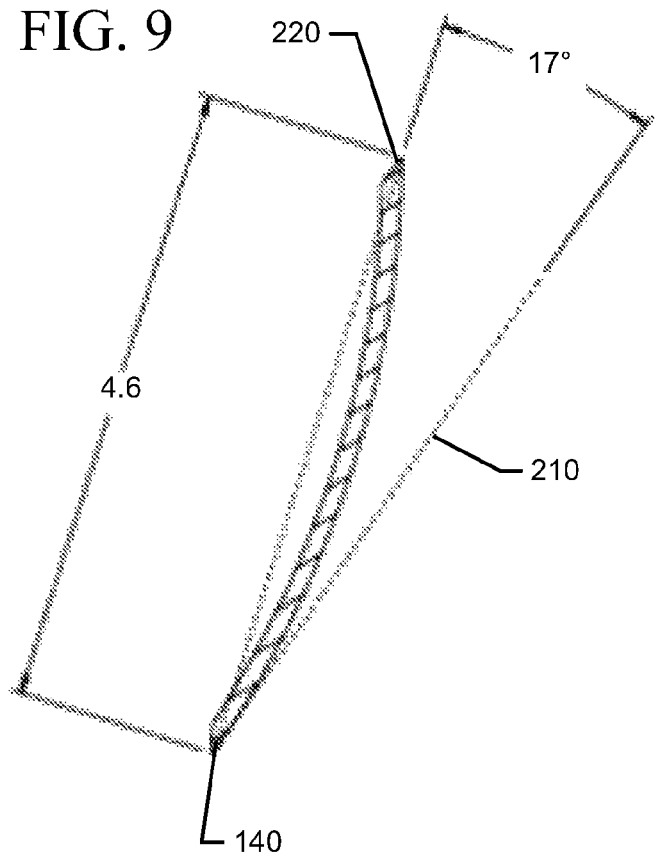
FIG. 9 shows a cross section view of the wing portion taken along line A-A' of FIG. 3 according to an example embodiment.
Figure 10:
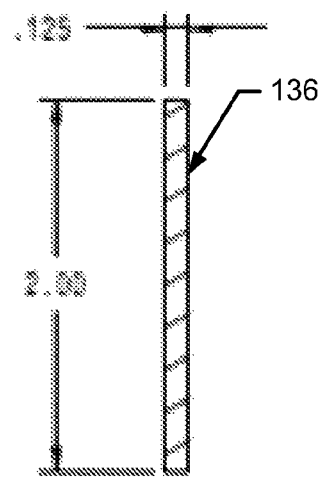
FIG. 10 shows a cross section view taken along line B-B' of FIG. 3 according to an example embodiment.

A description of an example embodiment will follow in reference to FIGS. 1-10. FIG. 1 illustrates a top perspective view of a high efficiency blade 100 according to an example embodiment. FIG. 2 illustrates a side view of the high efficiency blade 100, and FIGS. 3 and 4 illustrate top and bottom views, respectively, of the high efficiency blade 100. FIG. 5 illustrates a perspective view (taken from a perspective at a blade axis of the high efficiency blade 100) of a wing portion 110 and a transition region 120 of a single cutting element of the high efficiency blade 100. FIG. 6 is a top, perspective view of the wing portion 110 and the transition region 120 of the single cutting element of FIG. 5. Meanwhile, FIG. 7 is a perspective view of the single cutting element from a point situated in front of the wing portion 110, while FIG. 8 is a perspective view from a point displaced from a distal end of the wing portion 110. FIG. 9 shows a cross section view of the wing portion 110 taken along line A-A' of FIG. 3, and FIG. 10 shows a cross section view taken along line B-B' of FIG. 3.

Referring now to FIGS. 1-8, the high efficiency blade 100 may include a plurality of cutting elements (e.g., first cutting element 102, second cutting element 104, third cutting element 106, and fourth cutting element 108). The cutting elements are configured to define a balanced and symmetrical structure to improve the ease at which the high efficiency blade 100 can be rotated by a shaft driven by the engine of the lawn mower. The high efficiency blade 100 also includes a mounting portion 130 to which each of the cutting elements is attached. The mounting portion 130 may include a mounting orifice 132 at a center thereof. The mounting orifice 132 may have any desired shape for interfacing with the shaft of the lawn mower. Thus, for example, the mounting orifice 132 could have a circular shape (as shown) or other shapes such as a star shape, rectangular shape, triangular shape, or numerous other geometric shapes. The mounting portion 130 may interface with the shaft of the lawn mower either directly or indirectly (e.g., via a mounting structure operably coupled to the shaft). In any case, the mounting portion 130 (and the mounting orifice 132 in particular) may define an axis 134 of rotation for the high efficiency blade 100.

The mounting portion 130 may also include a corresponding instance of a mounting arm 136 for each respective one of the first cutting element 102, the second cutting element 104, the third cutting element 106, and the fourth cutting element 108. The mounting arms 136 may desirably have a significantly smaller width than the wing portions 110 in order to minimize the weight of the mounting portion 130. By keeping the weight of the mounting portion 130 low, and by providing good aerodynamic characteristics for the wing portion 110, the lift provided by the high efficiency blade 100 may be increased and the power needed to turn the high efficiency blade 100 may be decreased. Additionally, by employing a balanced configuration with four cutting elements spaced equally apart from each other, and having corresponding cutting edges and lifting surfaces may increase efficiency of the high efficiency blade 100 by greater than 20% relative to a more conventional two cutting edge design.

A cutting portion of each of the cutting elements may include a first cutting edge 140 and a second cutting edge 142. The first cutting edge 140 may extend across a leading edge of the wing portion 110, and the second cutting edge 142 may extend across the leading edge of the transition region 120. In an example embodiment, the first cutting edge 140 may extend entirely across the leading edge of the wing portion 110, and the second cutting edge 142 may extend entirely across the leading edge of the transition region 120. However, it is possible that the first and second cutting edges 140 and 142 could be formed to extend over only parts (and not all) of the leading edges of the wing portion 110 and transition region, respectively. In the context of this disclosure the leading edge should be understood in reference to a direction of rotation shown by arrow 144 (i.e., clockwise when viewed from above).

The wing portion 110 may be a plate-like piece of material (e.g., a fin or wing) shaped to have a substantially consistent shape from a proximal end 200 (see FIGS. 8 and 9) of the wing portion 110 to a distal end 202 of the wing portion 110. The proximal end 200 of the wing portion 110 may be attached to a distal end 204 of the transition region 120. A proximal end 206 of the transition region 120 may be attached to the mounting portion 130.

In an example embodiment, the first cutting edge 140 of each of the cutting elements may be in a same plane (e.g., a cutting plane 210) such that rotation of the high efficiency blade 100 carries the first cutting edges 140 of all of the cutting elements consistently through the cutting plane 210 (see FIG. 2). As best seen in FIG. 8, the wing portion 110 may be formed to curve (over a substantially consistent arc) from the first cutting edge 140 to a trail edge 220 of the wing portion 110.

In an example embodiment, the trail edge 220 of each of the wing portions 110 of the cutting elements may also lie in a same plane (e.g., a trail edge plane 230 shown in FIG. 2) that is spaced apart from the cutting plane 210. Meanwhile, the trail edge 220 and the first cutting edge 140 of each of the cutting elements may extend from the proximal end 200 to the distal end 202 of the wing portion 110 substantially parallel to each other. The trail edge 220 may also be chamfered in order to further increase efficiency of the high efficiency blade 100 by about 2% as compared to a similar design without the chamfered characteristic. In some embodiments, the mounting portion 130 (and therefore the mounting arms 136) may lie in a plane substantially halfway between the cutting plane 210 and the trail edge plane 230 (or in a range of between about 40% to about 60% of the way in between the cutting plane 210 and the trail edge plane 230).

A chord length of the wing portion 110 may be selected to be about 4.6 inches. This chord length increases efficiency by about 3% due to the aerodynamic characteristics of the resulting wing. As shown in FIG. 9, for the chord length of about 4.6 inches at the wing portion 110, an angular difference (i.e., wing angle of attack) measured from the cutting plane 210 to line passing directly from the first cutting edge 140 to the trail edge 220 may be about 17 degrees. However, any values from about 10 degrees to about 30 degrees may be employed in various example embodiments. A wing angle of attack in this range provides good lift and improved efficiency. Moreover, at the wing angle of attack of 17 degrees, an increased efficiency of about 17% is experienced relative to designs without a wing angle.

As can be appreciated from FIGS. 1-8, the wing portion 110 is in a swept configuration relative to the transition region 120 (and corresponding portions of the mounting portion 130 that are operably coupled to each respective transition region 120 of the cutting elements). In particular, as shown in FIG. 3, an angular difference between a line 250 extending along the first cutting edge 140 and a radial line 255 extending from the axis 134 at the mounting orifice 132 to the blade tip (i.e., an intersection between the distal end 202 of the wing portion 110 and the first cutting edge 140) may be about 30 degrees. This angular difference defines a swept angle 260 or the degree to which the first cutting edge 140 is swept (forward in this example) in relation to the mounting arms 136.

In an example embodiment, a width of the mounting arms 136 (as shown in FIG. 10) may be about 43% of the chord length of the wing portion 110. Thus, in this example, the width of the mounting arms 136 may be about 2 inches since the chord length is 4.6 inches. The transition region 120 may be structured to provide the transition from the mounting arms 136 to the wing portion 110 both in terms of accommodating the swept angle 260, the transition from a narrower (e.g., 2 inch) mounting arm 136 to a wider (e.g., 4.6 inch chord length) wing portion 110, and the transition from a flat mounting arm 136 to a curved wing portion 110. Accordingly, the transition region 120 may be configured to simultaneously broaden and twist while also bending from the proximal end 206 to the distal end 204 of the transition region 120. In this regard, for example, the transition region 120 bends forward about 30 degrees (e.g., to the right as viewed from the top, but generally forward toward the leading edge of the wing portion 110) to provide the swept angle 260. The transition region 120 is also twisted since the mounting arms 136 are flat and located in between the trail edge plane 230 and the cutting plane 210 so that a rear part (or trail end) of the transition region 120 rises from the rear end or trail end of the mounting arms 136 to meet the trail edge 220 of the wing portion. Meanwhile, a front part or leading edge of the transition region 120 falls from the front part or trail end of the mounting arms 136 to meet the first cutting edge 140. The second cutting edge 142 follows this transition and therefore includes a curve that extends upward away from the cutting plane 210 while simultaneously curving at an angle in a direction away from the trail edge 220 of the wing portion 110. The extension of the second cutting edge 142 upward and away from the cutting plane 210 enables the second cutting edge 142 to act as a mulching blade in combination with the significant lift provided by the wing portion 110.

In some example embodiments, an aerodynamic orifice 300 may be provided in the transition region 120 in order to further improve efficiency. The aerodynamic orifice 300 may be provided at an approximate midpoint of the transition region 120 between the distal end 204 and proximal end 206 thereof. In some cases, the aerodynamic orifice 300 may be round, rectangular or have another geometric shape. However, by employing a square shape (e.g., with rounded corners) at the midpoint of the transition region 120, efficiency of the high efficiency blade 100 may be increased by about 11% as compared to the same design without the aerodynamic orifice 300.

The high efficiency blade 100 of an example embodiment employs the various efficiency improving features in combination to maximize efficiency. However, it should also be appreciated that subsets of the features described above could also be employed in various combinations in order to improve efficiency as well without necessarily combining all of the features. The combination of all of the features described above has been shown to provide as much as 63% more lift per pound of drag, and 40% less drag than a comparable lift provided by a standard mower blade offered today.

Accordingly, some example embodiments may include a cutting blade for a lawn mower. The cutting blade may include a mounting portion and a plurality of cutting elements. The mounting portion may include a plurality of mounting arms and a mounting orifice formed at an axis of the cutting blade. The mounting orifice may be configured to interface with a shaft of the lawn mower. Each of the cutting elements may be operably coupled to a corresponding one of the mounting arms. Each of the cutting elements may include a wing portion at a distal end thereof, and a transition region configured to operably couple the wing portion to a respective one of the mounting arms. The cutting elements may further include a first cutting edge disposed at the wing portion, and a second cutting edge disposed at the transition region.

In an example embodiment, the cutting blade may include additional, optional features, and/or the features described above may be modified or augmented. Some examples of modifications, optional features and augmentations are described below. It should be appreciated that the modifications, optional features and augmentations may each be added alone, or they may be added cumulatively in any desirable combination. In an example embodiment, the first cutting edge of each of the cutting elements may extend linearly across a leading edge of the wing portion from a proximal end of the wing portion to a distal end of the wing portion, and the first cutting edge of each of the cutting elements may lie in a cutting plane. In an example embodiment, the wing portion may further include a trail edge disposed opposite the first cutting edge on the wing portion and extending substantially parallel to the first cutting edge, and the trail edge of each of the cutting elements may lie in a trail edge plane. In some cases, the mounting portion may lie in a plane about half way between the trail edge plane and the cutting plane. In an example embodiment, the trail edge may be chamfered. In some cases, the second cutting edge may extend across a leading edge of the transition region from a proximal end of the transition region to a distal end of the transition region. In an example embodiment, the second cutting edge and the first cutting edge may form a continuous cutting surface, and the second cutting edge may extend away from the cutting plate as the second cutting edge moves away from the distal end of the transition region toward the proximal end of the transition region. In some cases, the second cutting edge bends away from the trail edge as the second cutting edge moves away from the distal end of the transition region toward the proximal end of the transition region. In an example embodiment, a chord length of the wing portion from the first cutting edge to the trail edge may be more than twice a width of the mounting arm. In some cases, the transition region may be configured to taper in width from a leading edge to a trailing edge thereof from the chord length of the wing portion at a distal end of the transition region to the width of the mounting arm at a proximal end of the transition region. In an example embodiment, the transition region may include an aerodynamic orifice disposed at a portion thereof. In some cases, the aerodynamic orifice may have a square shape with rounded corners. In an example embodiment, the aerodynamic orifice may be disposed at a center of the transition region. In some cases, the electronic connection assembly may include a corded connection between an electrical system of the host device and the electric motor. In an example embodiment, the wing portion may be configured to curve from the first cutting edge to the trail edge defining an attack angle of between about 15 degrees and 20 degrees. In some cases, the wing portion may be swept relative to the mounting arm at a swept angle of between about 20 degrees and 40 degrees. In an example embodiment, the swept angle may be about 30 degrees. In some cases, the cutting blade may include four cutting elements equidistantly spaced apart from each other. In an example embodiment, the wing portion may be curved and the mounting portion is flat. The transition region may be flat at a proximal end thereof and curved at a distal end thereof to transition from the mounting portion to the wing portion. In some cases, the distal end of the transition region may include a first portion that extends downward from a plane in which the mounting portion lies to the first cutting edge, and a second portion that extends upward from the plane to a trail edge of the wing portion.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A cutting blade for a lawn mower, the cutting blade comprising:
    a mounting portion comprising a plurality of mounting arms and a mounting orifice formed at an axis of the cutting blade, the mounting orifice being configured to interface with a shaft of the lawn mower; and
    a plurality of cutting elements, each of the cutting elements operably coupled to a corresponding one of the mounting arms,
    wherein each of the cutting elements comprises a wing portion at a distal end thereof, and a transition region configured to operably couple the wing portion to a respective one of the mounting arms, and
    wherein the cutting elements further comprise a first cutting edge disposed at the wing portion, and a second cutting edge disposed at the transition region,
    wherein the first cutting edge of each of the cutting elements extends linearly across a leading edge of the wing portion from a proximal end of the wing portion to a distal end of the wing portion,
    wherein the first cutting edge of each of the cutting elements lies in a cutting plane,
    wherein the wing portion further comprises a trail edge disposed opposite the first cutting edge on the wing portion and extending substantially parallel to the first cutting edge,
    wherein the trail edge of each of the cutting elements lies in a trail edge plane, and
    wherein a chord length of the wing portion from the first cutting edge to the trail edge is more than twice a width of the mounting arm.

2. The cutting blade of claim 1, wherein the mounting portion lies in a plane about half way between the trail edge plane and the cutting plane.

3. The cutting blade of claim 1, wherein the trail edge is chamfered.

4. The cutting blade of claim 1, wherein the second cutting edge extends across a leading edge of the transition region from a proximal end of the transition region to a distal end of the transition region.

5. The cutting blade of claim 4, wherein the second cutting edge and the first cutting edge form a continuous cutting surface, and
    wherein the second cutting edge extends away from the cutting plane as the second cutting edge moves away from the distal end of the transition region toward the proximal end of the transition region.

6. The cutting blade of claim 5, wherein the second cutting edge bends away from the trail edge as the second cutting edge moves away from the distal end of the transition region toward the proximal end of the transition region.

7. The cutting blade of claim 1, wherein the wing portion is configured to curve from the first cutting edge to the trail edge defining an attack angle of between about 15 degrees and 20 degrees.

8. The cutting blade of claim 1, wherein the wing portion is swept relative to the mounting arm at a swept angle of between about 20 degrees and 40 degrees.

9. The cutting blade of claim 8, wherein the swept angle is about 30 degrees.

10. The cutting blade of claim 1, wherein the cutting blade comprises four cutting elements equidistantly spaced apart from each other.

11. The cutting blade of claim 1, wherein the wing portion is curved and the mounting portion is flat, and
    wherein the transition region is flat at a proximal end thereof and curved at a distal end thereof to transition from the mounting portion to the wing portion.

12. The cutting blade of claim 11, wherein the distal end of the transition region includes a first portion that extends downward from a plane in which the mounting portion lies to the first cutting edge, and a second portion that extends upward from the plane to a trail edge of the wing portion.

13. A cutting blade for a lawn mower, the cutting blade comprising:
    a mounting portion comprising a plurality of mounting arms and a mounting orifice formed at an axis of the cutting blade, the mounting orifice being configured to interface with a shaft of the lawn mower; and
    a plurality of cutting elements, each of the cutting elements operably coupled to a corresponding one of the mounting arms,
    wherein each of the cutting elements comprises a wing portion at a distal end thereof, and a transition region configured to operably couple the wing portion to a respective one of the mounting arms, and
    wherein the cutting elements further comprise a first cutting edge disposed at the wing portion, and a second cutting edge disposed at the transition region,
    wherein the first cutting edge of each of the cutting elements extends linearly across a leading edge of the wing portion from a proximal end of the wing portion to a distal end of the wing portion,
    wherein the first cutting edge of each of the cutting elements lies in a cutting plane, wherein the wing portion further comprises a trail edge disposed opposite the first cutting edge on the wing portion and extending substantially parallel to the first cutting edge, wherein the trail edge of each of the cutting elements lies in a trail edge plane wherein the second cutting edge extends across a leading edge of the transition region from a proximal end of the transition region to a distal end of the transition region wherein the second cutting edge and the first cutting edge form a continuous cutting surface, and wherein the second cutting edge extends away from the cutting plane as the second cutting edge moves away from the distal end of the transition region toward the proximal end of the transition region.

14. The cutting blade of claim 13, wherein a chord length of the wing portion from the first cutting edge to the trail edge is more than twice a width of the mounting arm.

15. The cutting blade of claim 14, wherein the transition region is configured to taper in width from a leading edge to a trailing edge thereof from the chord length of the wing portion at a distal end of the transition region to the width of the mounting arm at a proximal end of the transition region.

16. The cutting blade of claim 15, wherein the transition region comprises an aerodynamic orifice disposed at a portion thereof.

17. The cutting blade of claim 16, wherein the aerodynamic orifice has a square shape with rounded corners.

18. The cutting blade of claim 17, wherein the aerodynamic orifice is disposed at a center of the transition region.

* * * * *